(12) United States Patent
Zetterberg et al.

(10) Patent No.: US 9,800,382 B2
(45) Date of Patent: Oct. 24, 2017

(54) METHOD AND ARRANGEMENT IN A COMMUNICATION NETWORK SYSTEM

(75) Inventors: Kristina Zetterberg, Linkoping (SE); Mehdi Amirijoo, Linkoping (SE); Pal Frenger, Linkoping (SE); Fredrik Gunnarsson, Linkoping (SE); Johan Moe, Mantorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1742 days.

(21) Appl. No.: 13/132,646

(22) PCT Filed: Dec. 5, 2008

(86) PCT No.: PCT/SE2008/051411
§ 371 (c)(1),
(2), (4) Date: Jun. 3, 2011

(87) PCT Pub. No.: WO2010/064968
PCT Pub. Date: Jun. 10, 2010

(65) Prior Publication Data
US 2011/0235529 A1    Sep. 29, 2011

(51) Int. Cl.
*G01R 31/08* (2006.01)
*H04L 5/00* (2006.01)
(Continued)

(52) U.S. Cl.
CPC ........ *H04L 5/0053* (2013.01); *H04L 27/2607* (2013.01); *H04W 52/343* (2013.01); *H04W 52/50* (2013.01); *H04W 52/325* (2013.01)

(58) Field of Classification Search
CPC .................................................. H03F 1/3247
See application file for complete search history.

(56) References Cited

U.S. PATENT DOCUMENTS

2007/0165567 A1* 7/2007 Tan et al. ............. 370/329
2009/0067540 A1* 3/2009 Lee et al. ............. 375/296

OTHER PUBLICATIONS

"3rd Generation Partnership Project; Technical Specification Group Radio Access Network; Evolved Universal Terrestrial Radio Access (E-UTRA); Physical Channels and Modulation (Release 8)" 3GPP Standard; 3GPP TS 36.211, 3rd Generation Partnership Project (3GPP), Mobile Competence Centre ; 650, Route Des Lucioles ; F-06921 Sophia-Antipolis Cedex ; France, No. V8.4.0, Sep. 2008 (Sep. 2008), pp. 1-78, XP050377536 p. 31, paragraph 5.7.1—p. 36.
(Continued)

*Primary Examiner* — Samina Choudhry
(74) *Attorney, Agent, or Firm* — Rothwell, Figg, Ernst & Manback, P.C.

(57) ABSTRACT

The present invention relates to a method and a communication network node for enabling automatic optimization of a random access preamble format usage in a communication network system. The network comprises the communication network node serving at least one cell to which user equipments are accessing. A random access preamble format is set for each cell and comprises a random access sequence length, $T_{SEQ}$, and a random access preamble cyclic prefix length, $T_{CP}$. First, the random access sequence length, $T_{SEQ}$ is selected and then the random access preamble cyclic prefix length, T CP is selected. Based on the selected random access sequence length, T SEQ and random access preamble cyclic prefix length, $T_{CP}$, which random access preamble format to use in said cell is selected.

2 Claims, 14 Drawing Sheets

(51) Int. Cl.
*H04L 27/26* (2006.01)
*H04W 52/34* (2009.01)
*H04W 52/50* (2009.01)
*H04W 52/32* (2009.01)

(56) References Cited

OTHER PUBLICATIONS

Motorola: "E-UTRA TDD Random Access" 3GPP Draft; R1-071856_RACH_TDD, 3rd Generation Partnership Project (3GPP), Mobile Competence Centre ; 650, Route Des Lucioles ; F-06921 Sophia-Antipolis Cedex; France, vol. RAN WG1, No. Beijing, China; Apr. 17, 2007, Apr. 17, 2007 (Apr. 17, 2007), XP050111761 [retrieved on Apr. 17, 2007] paragraphs [0003], [0005].

CATT et al: "Preamble design of non-synchronized RACH for E-UTRA TDD" 3GPP Draft; R1-070834, 3rd Generation Partnership Project (3GPP), Mobile Competence Centre ; 650, Route Des Lucioles ; F-06921 Sophia-Antipolis Cedex; France, vol. RAN WG1, No. St. Louis, USA; Feb. 6, 2007, Feb. 6, 2007 (Feb. 6, 2007), XP050104853 [retrieved on Feb. 6, 2007] paragraphs [0002], [0003].

Ericsson: "Power Control for PRACH" 3GPP Draft; R1-080879, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; Feb. 6, 2008, Feb. 6, 2008 (Feb. 6, 2008), XP050109354 [retrieved on Feb. 6, 2008] paragraphs [0002], [0003].

Office Action issued on Apr. 12, 2013, in corresponding Japanese Application No. 2011-539472, 2 pages.

* cited by examiner

METHOD AND ARRANGEMENT IN A COMMUNICATION NETWORK SYSTEM

CROSS REFERENCE TO RELATED APPLICATION(S)

This application is a 35 U.S.C. §371 National Phase Entry Application from PCT/SE2008/051411, filed Dec. 5, 2008, and designating the United States, the disclosure of which is incorporated herein in its entirety by reference.

TECHNICAL FIELD

The present invention relates to a method and an arrangement in a communication network system and, more particular to an arrangement allowing for enabling automatic optimization of random access format usage as well as a method for such enablement.

BACKGROUND

The third generation partnership project (3GPP) is currently working on standardization of the first release of the Third Generation (3G) Long Term Evolution (LTE) concept. In LTE the downlink is based on orthogonal frequency division multiplexing (OFDM) while the uplink is based on a single carrier modulation method known as discrete Fourier transform spread OFDM (DFT-S-OFDM).

A Random Access (RA) procedure is performed by a user equipment (UE) to seek access to and notify its presence in a network. This is done during initial access, when the UE has lost the uplink synchronization or when the UE is in an idle or a low-power mode.

The basic RA Procedure is a four-phase procedure as outlined in FIG. 2:
  Phase 1 consists of transmission (step 21) of a random access preamble from the UE 18 to eNode B (eNB) 15, allowing the eNB to estimate the transmission timing of the UE.
  Phase 2 consists of the network transmitting (step 22) a timing advance command to correct the uplink timing, based on the timing of arrival measurement in the first step. Uplink resources and a temporary identifier are assigned to the UE.
  Phase 3 consists of signaling from the UE to the network using the uplink synchronization channel (UL-SCH) similar to normal scheduled data. A primary function of this message is to uniquely identify the UE. The exact content of this signaling depends on the state of the UE, e.g., whether it is previously known to the network or not. Thus, a Radio Resource Control (RRC) connection request is sent from the UE 18 to eNB 15 (step 23).
  Phase 4, the final phase, is responsible for contention resolution in case multiple UEs tried to access the system on the same resource. Thus, a RRC connection setup is done (step 24).

RA preambles are based on Zadoff-Chu (ZC) root sequences and cyclic shifts of these, giving good time-domain auto-correlation properties allowing for accurate uplink channel estimation.

Four different preamble formats are defined for LTE Frequency Division Duplex (FDD) in 3GPP. For LTE Time Division Duplex (TDD), only one preamble format is defined. Therefore, choosing preamble format for TDD is not described in the present application. The methods described herein are however not limited to only LTE FDD.

The preamble format specifies both the length of the Cyclic Prefix and the number of RA sequence repetitions. The different preamble formats for LTE FDD are shown in the table below and in FIG. 8 (described in more detail further below), in which $T_{CP}$ is the cyclic prefix time and $T_{SEQ}$ is the sequence time, i.e. the time used to transmit the RA sequence(s) in a RA preamble.

| Preamble format | $T_{CP}$ | $T_{SEQ}$ |
|---|---|---|
| 0 | $3168 \cdot T_S$ | $24576 \cdot T_S$ |
| 1 | $21024 \cdot T_S$ | $24576 \cdot T_S$ |
| 2 | $6240 \cdot T_S$ | $2 \cdot 24576 \cdot T_S$ |
| 3 | $21024 \cdot T_S$ | $2 \cdot 24576 \cdot T_S$ |

The RA preamble format parameter needs to be set in every cell and depends on the cell size and radio conditions. The RA preamble format parameter may be set manually, but in order to find the most suitable parameter setting, time-consuming and costly simulations and drive tests would according to previously known methods have to be performed.

If network characteristics change, e.g. the interference level increases or the antenna tilt is changed, the RA preamble format may need to be changed. With the, in comparison slow, manual processes, the RA preamble format setting will not be sufficiently responsive to changes in network.

There is, therefore, need for improved methods and arrangements, which enable automatic tuning of the RA preamble format.

SUMMARY

Accordingly, one objective of the present invention is to provide an improved method and communication network node for enabling automatic optimization of a random access preamble format usage in a communication network system. The network comprises the communication network node serving at least one cell to which user equipments are accessing. A random access preamble format is set for each cell and comprises a random access sequence length, $T_{SEQ}$, and a random access preamble cyclic prefix length, $T_{CP}$.

According to a first aspect of the present invention this objective is achieved through a method as defined in the characterizing portion of claim 1, which specifies that automatic optimization of a random access preamble format usage is enabled by a method which performs the steps of:
  selecting said random access sequence length, $T_{SEQ}$;
  selecting said random access preamble cyclic prefix length, $T_{CP}$; and,
  based on said selected random access sequence length, $T_{SEQ}$ and random access preamble cyclic prefix length, $T_{CP}$, selecting which random access preamble format to use in said cell.

According to a second aspect of the present invention this objective is achieved through a communication network node as defined in the characterizing portion of claim 19, which specifies that automatic optimization of a random access preamble format usage is enabled by a communication network node being configured to:
  select said random access sequence length, $T_{SEQ}$;
  select said random access preamble cyclic prefix length, $T_{CP}$; and,
  based on said selected random access sequence length, $T_{SEQ}$ and random access preamble cyclic prefix length, $T_{CP}$, select which random access preamble format to use in said cell.

Further embodiments are listed in the dependent claims.

Thanks to the provision of a method and a communication network node, in which automatic optimization of RACH parameters is enabled, such as the RA sequence length and cyclic prefix length, i.e. the RACH format, lower costs for the operators in planning and tuning RACH, as well as improved system performance is obtained. Further, very little or no human intervention is required when optimizing RACH parameters, resulting in a reduction of operational expenditures. Also, the methods presented are responsive to changes in the radio environment. Radio propagation models based on, e.g., topology, are not needed, since the invention relies on reports from the user equipments, and/or measurements performed by the eNB.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
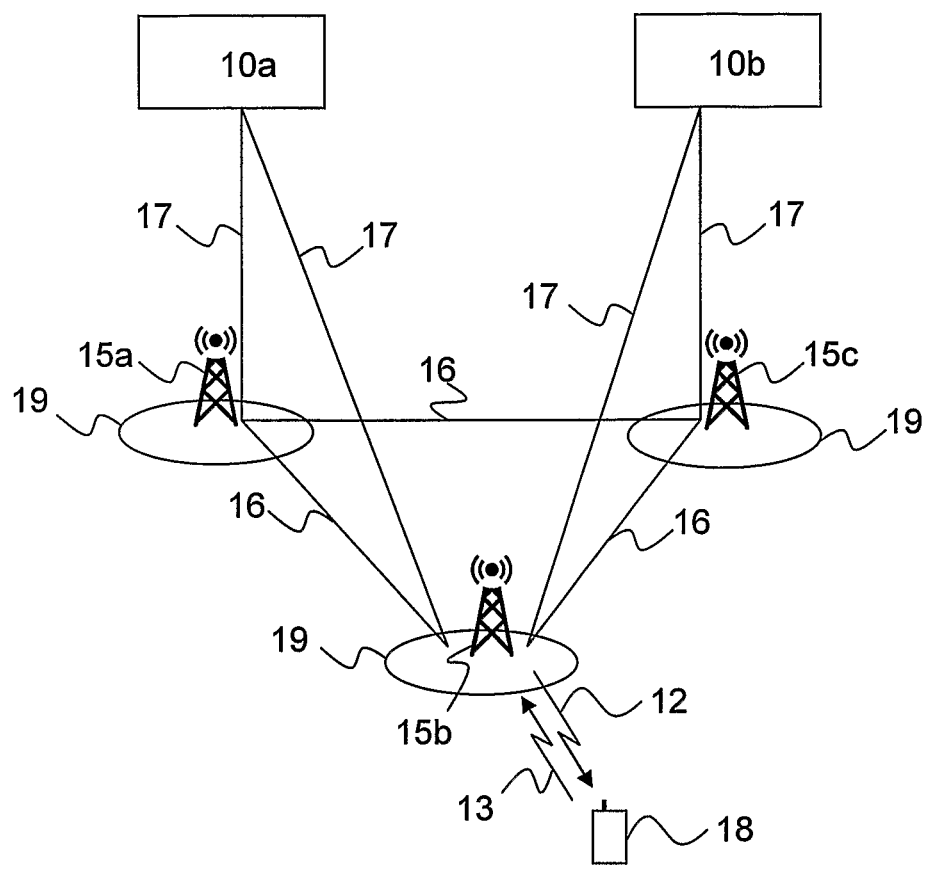
FIG. 1 shows an example of a LTE communication network architecture.
Figure 2:
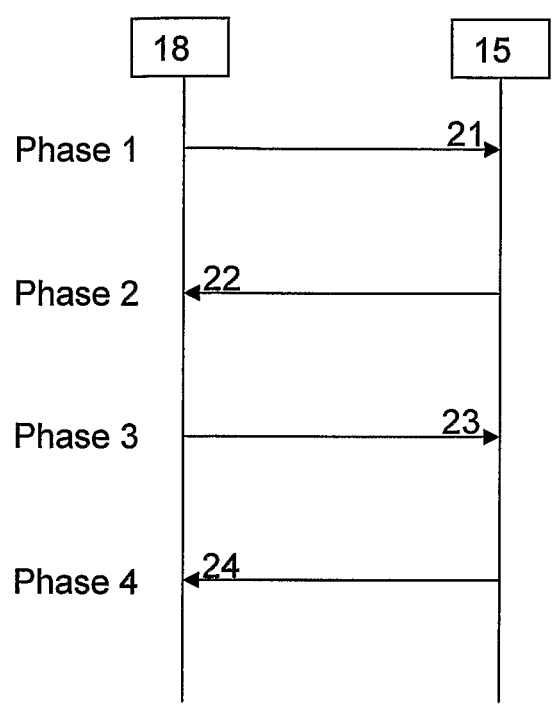
FIG. 2 is a diagram of a random access procedure.

FIG. 1 depicts a communication system, including a radio access system (RAN) such as E-UTRAN, comprising at least one Radio Base Station (RBS), such as evolved Node B (eNB) 15a, 15b and 15c. The RAN is connected over an interface such as the S1-interface 17 to at least one Evolved Packet Core (EPC) network 10a and 10b, which is connected to external networks (not shown in FIG. 1) such as the Public Switched Telephone Network (PSTN) or the Integrated Services Digital Network (ISDN), and/or a connectionless external network as the Internet. Each EPC 10a and 10b comprises e.g. a Mobility Management Entity (MME) which handles control signaling for instance for mobility.

The RAN provides communication and control for a plurality of user equipments (UE) 18 (only one shown in FIG. 1) and each eNB 15a-15c is serving at least one cell 19 through and in which the UEs 18 are moving. The eNBs 15a-15c are communicating with each other over a communication interface 16, such as X2. The UEs each uses downlink (DL) channels 12 and uplink (UL) channels 13 to communicate with at least one eNB over a radio or air interface.

According to a preferred embodiment of the present invention, the communication system is herein described as a LTE system. The skilled person, however, realizes that the inventive method and arrangement work very well on other communications systems using different formats as well. The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

As stated above, a random access procedure is performed by a UE when accessing a network. This procedure is started by the UE sending a random access preamble to the eNB. Below the RA preambles and the input parameters are described in more detail.

RA Preamble Detection

RA preambles are based on Zadoff-Chu (ZC) root sequences and cyclic shifts of these, giving good time-domain auto-correlation properties allowing for accurate uplink channel estimation.

Figure 3:
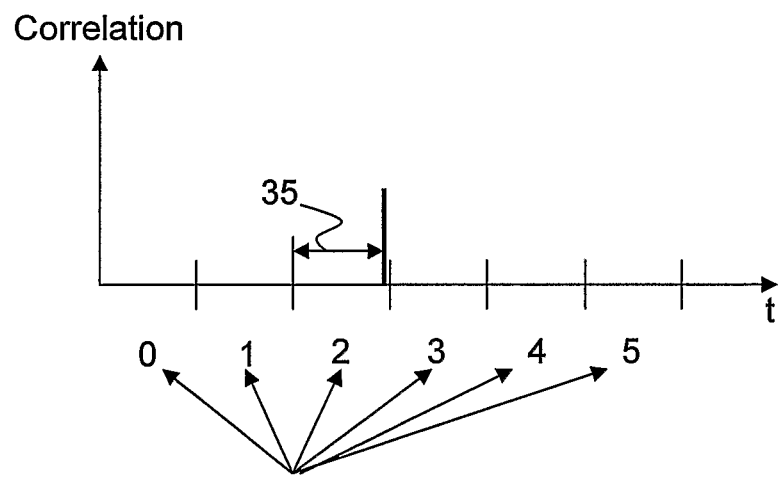
FIG. 3 shows the correlation of a received signal.

The signal received at the eNB is correlated with all the root sequences allocated to the eNB. The root sequence with which correlation is found and the zone in which the correlation peak is found indicates which root sequence respectively cyclic shift that has been used. This is illustrated in FIG. 3, which shows the correlation peak when the UE is almost at the cell border. The time delay 35 indicates the round trip time and the arrows indicates the zones 0-5 indicating transmitted sequences.

Correlation peaks may also occur due to noise or cross-interference from preambles derived from a different root sequence. A detection threshold is used to separate true correlations peaks from noise.

Once the correlation peak has been found, the round-trip time may be estimated based on the placement of the peak within the correlation zone.

Delay Spread

Figure 4:
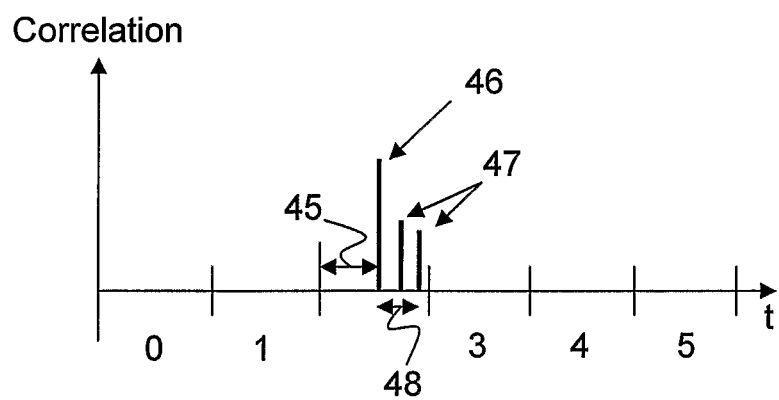
FIG. 4 shows the correlation peaks due to delay spread.

There may appear multipath components due to delay spread in the root sequence correlation made at the receiver. This is illustrated in FIG. 4 in which the round trip time is denoted 45. The distance 48 between the main correlation peak 46 and a multipath correlation peak 47 indicates the delay for that component. The preamble detection threshold should be set so that only the main correlation peak is detected.

Cyclic Prefix and Guard Period

To account for uplink timing uncertainties and to avoid interference with subsequent subframes, a Guard Period (GP) is used, meaning that a time slot larger than the actual preamble transmission time is allocated for preamble transmissions.

At the receiver, samples are collected over a sampling window. To handle timing uncertainties and to enable low-complexity frequency domain processing, a Cyclic Prefix (CP) is added to the RA sequence. The cyclic prefix is simply an identical copy of the last part of the RA sequence.

Figure 5:
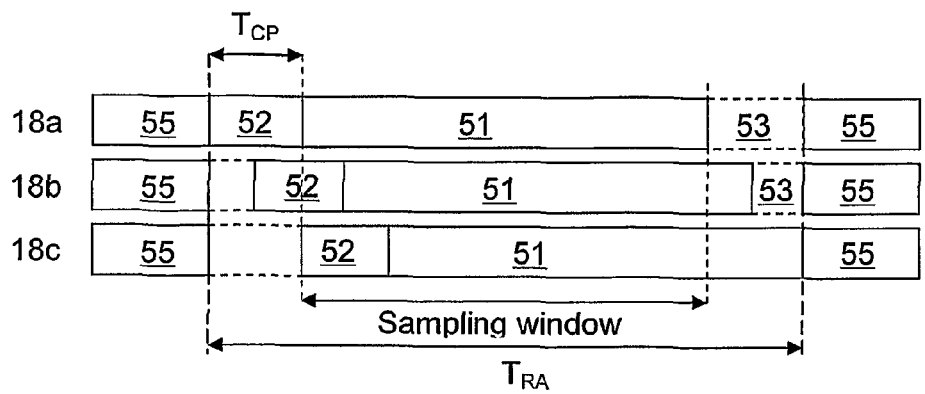
FIG. 5 illustrates how the cyclic prefix and guard period are used to account for uplink timing uncertainties.

FIG. 5 illustrates how the cyclic prefix 52 and the guard period 53 is used to account for uplink timing uncertainties for a user 18a on a near distance from the eNB, a medium distance user 18b and a far distance user 18c. Other users are denoted 55 and the RA sequence is denoted 51. For user 18a, the RA sequence 51 falls within the sampling window. For users 18b and 18c, the RA sequence 51 arrives later but due to the cyclic prefix 52 being identical to the last part of the RA sequence 51, the RA sequence may still be read out in the same sampling window.

It is easily realized by anyone skilled in the art, that in order to be able to detect the preamble, the cyclic prefix time $T_{CP}$ must be larger than or equal to the delay of the signal. For a high detection probability, the cyclic prefix time $T_{CP}$ should be larger than or equal to the largest possible delay, i.e. the roundtrip-time and the maximum multipath delay, see FIG. 4.

$$T_{CP} = CP \cdot T_S \geq T_{RT} + T_{MD} \quad (1)$$

where $T_S$ is the basic time unit ($T_S = 1/30720000$ s for LTE)
$T_{RT}$ is the round-trip delay, and
$T_{MD}$ is the maximum multipath delay In FIG. 5, the cyclic prefix 52 is chosen according to equ. (1).

Figure 6:
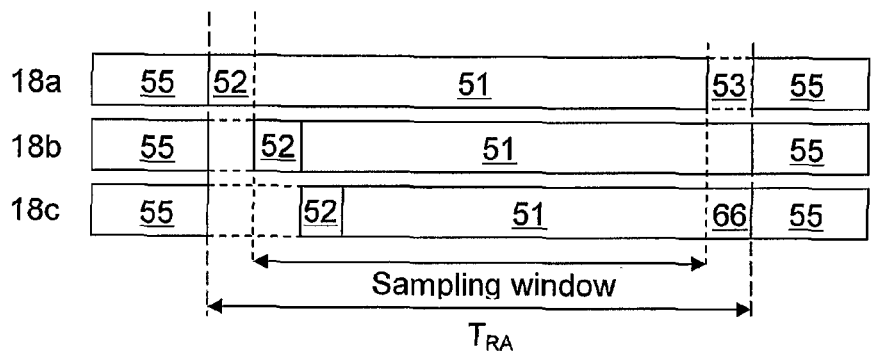
FIG. 6 illustrates an example of the sampling of a preamble having a short cyclic prefix.

FIG. 6 shows an example of the sampling of a preamble with $T_{CP} < T_{RT} + T_{MD}$, i.e. a too short $T_{CP}$. For the case where the user 18c is far away from the eNB, the entire RA sequence will not be read. The part of the RA sequence that is not sampled is denoted 66. FIG. 6 further shows how the cyclic prefix 52 and the guard period 53 is used to account for uplink timing uncertainties for a user 18a at a near distance from the eNB, and a medium distance user 18b according to equ. (1). Other users are denoted 55 and the RA sequence is denoted 51 in FIG. 6.

RA Sequence Repetition

Figure 7:
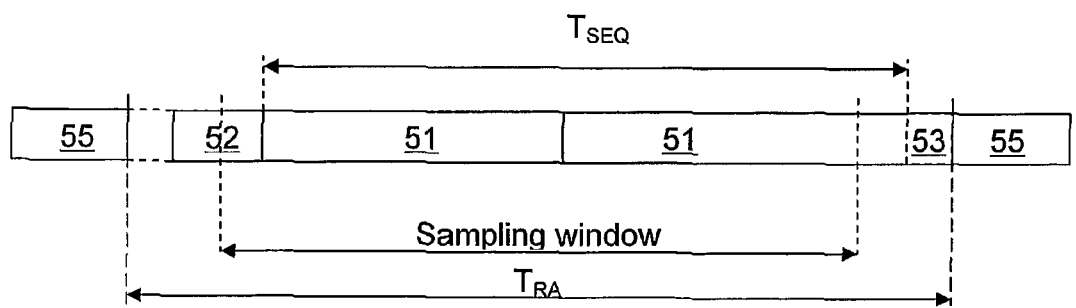
FIG. 7 shows a random access preamble with repeated random access sequence.
Figure 8A:
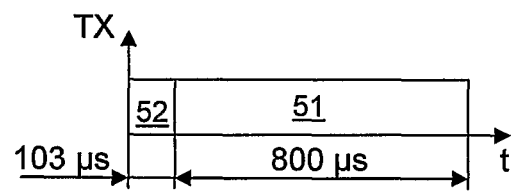
FIG. 8 shows the preamble formats for LTE FDD as specified by 3GPP.
Figure 8B:
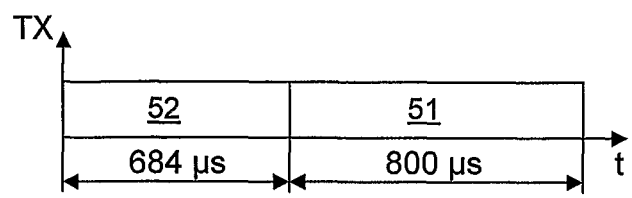
Figure 8C:
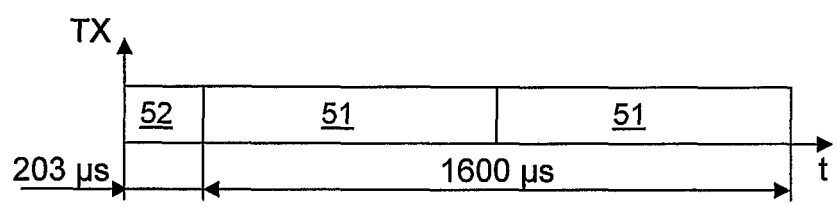
Figure 8D:
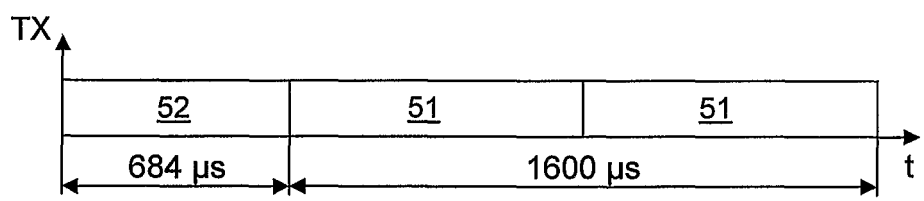

In environments with bad radio propagation properties, the received signal energy can be increased either by increasing the transmission power during the same amount of time or by transmitting with the same power during a longer time. With the latter method, the RA sequence is repeated, see FIG. 7, which shows a RA preamble with repeated RA sequence 51. The cyclic prefix is denoted 52, the guard period 53 and other users 55.

If the RA sequence for example is transmitted twice, this corresponds to twice the transmitted energy compared to if the RA sequence is transmitted only once. In decibels, the difference is 3 dB. The sequence time, i.e. the time used to transmit the RA sequence(s) in a RA preamble is denoted $T_{SEQ}$.

Preamble Format

As stated above in the background section, four different preamble formats are defined for LTE frequency Division duplex (FDD) in 3GPP, as shown in the table in the background section of the application and FIG. 8.

FIGS. 8a-8d show the preamble formats 0-3 respectively as specified by 3GPP. In FIGS. 8a-8d the cyclic prefix is denoted 52 and the RA sequence 51.

In the following, "normal long preamble" refers to preamble format 0 or 1, and "long preamble" refers to preamble format 2 or 3. The reasoning around how to choose a normal long or a long preamble described in the present application may however be applied to other preamble lengths and also to an arbitrary number of possible preamble lengths.

The power a preamble is transmitted with is for LTE FDD controlled by a preamble power control loop:

$$P_{PRACH} = \min\{P_{0\_PRACH} - PL + (N-1) \cdot \Delta_{RACH} + \Delta_{Preamble}, P_{max}\} \quad (2)$$

where $P_{0\_PRACH}$ is the target received power [dBm] at the first transmission attempt (if $\Delta_{Preamble} = 0$)
PL [dB] is a pathloss estimate
N is the PRACH transmission attempt number
$\Delta_{RACH}$ [dB] is the ramping step
$\Delta_{Preamble}$ is a preamble format-based offset, and
$P_{max}$ is the maximum UE power
$\Delta_{Preamble}$ is set to 0 dB for normal long preamble formats, and to −3 dB for long preamble formats. The value of $P_{max}$ may vary between different UE types.

As stated above, sufficient received signal energy is either achieved using a specific power level and one preamble, or half of this power level and two preambles. Power-limited users may therefore benefit from using the long preamble format, which thus corresponds to a wider coverage.

According to a general embodiment of the present invention which RA preamble format that is most suitable to use in a cell with respect to the current radio conditions and cell size is automatically chosen. The most suitable RA preamble format in this case refers to the RA preamble format that allows the most UEs to successfully perform a random access. Other RA aspects, such as for example minimizing the number of failed RA attempts, are controlled by other optimization mechanisms, such as the power and detection threshold optimization. The invention consists of two parts, choosing the RA sequence length and choosing the RA preamble cyclic prefix length. The cyclic prefix time should be larger than or equal to the largest possible delay in order to achieve a high detection probability.

Figure 9:
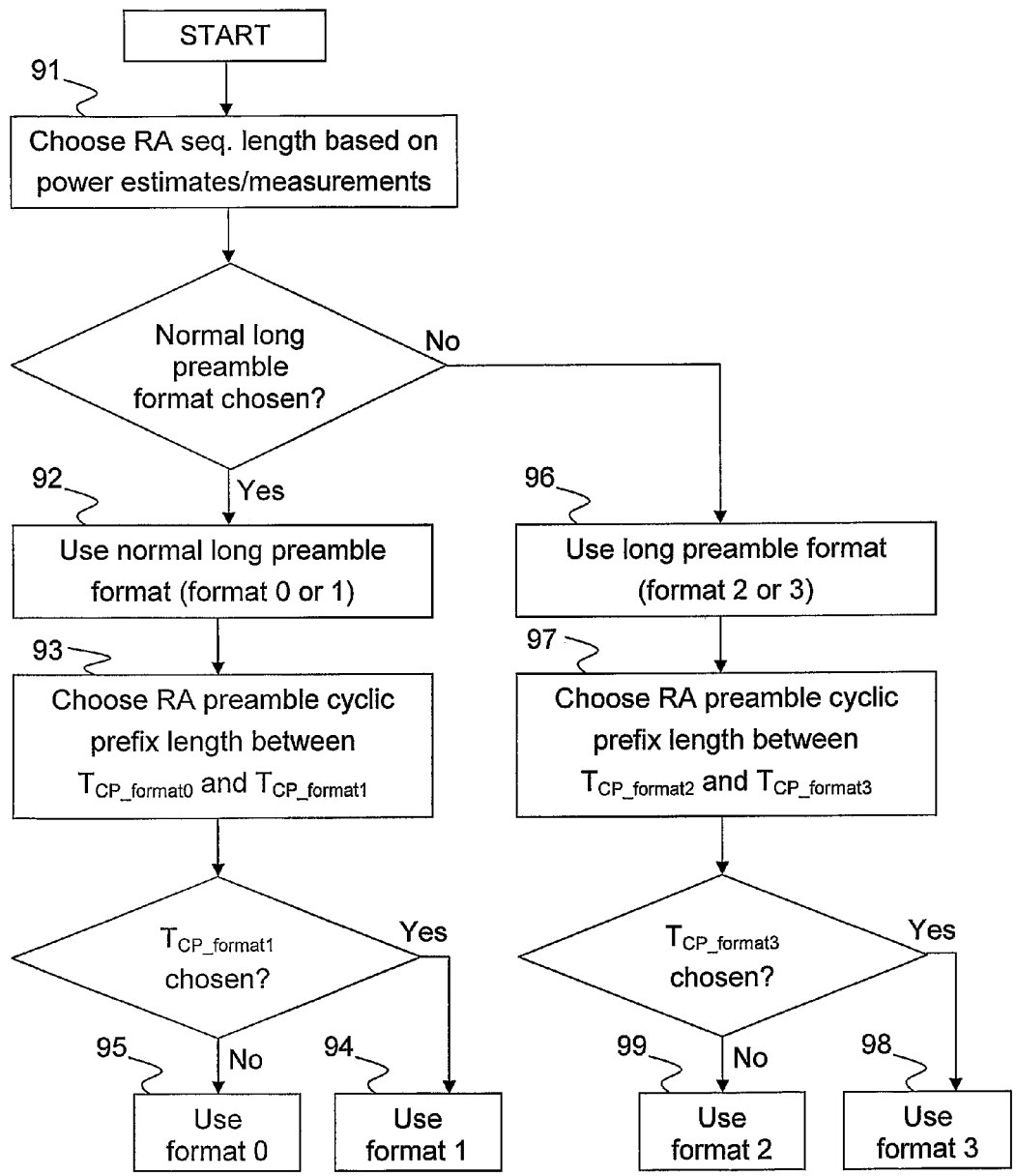
FIG. 9 is a flowchart illustrating the random access preamble format optimization for LTE according to a general embodiment.

Thus, the general procedure for enabling automatic tuning of random access preamble format parameters in a communication network system is shown in FIG. 9:

Choosing the RA sequence length (step 91) based on power estimates/measurements as explained in more detail in the different described embodiments further below. As mentioned above, the received signal energy may be increased either by increasing the transmission power or by using RA repetition, i.e. a long preamble format. Preferably, the long preamble format is used when higher received signal energy is desired but the transmission power has reached its maximum for a certain amount or percentage of the UEs;

If a normal long preamble format is chosen, using preamble format 0 or 1 (step 92);

Choosing the RA preamble cyclic prefix length (step 93) between $T_{CP\_format0}$ and $T_{CP\_format1}$;

If $T_{CP\_format1}$ is chosen, using preamble format 1 (step 94);

Otherwise, using preamble format 0 (step 95);

If a long preamble format is chosen, using a long preamble format 2 or 3 (step 96).

Choosing the RA preamble cyclic prefix length (step 97) between $T_{CP\_format2}$ and $T_{CP\_format3}$;

If $T_{CP\_format3}$ is chosen, using preamble format 3 (step 98);

Otherwise, using preamble format 2 (step 99);

In the following, different embodiments of the present invention will be described in more detail.

Choosing RA Sequence Length—First Embodiment

According to a first embodiment of the present invention, the RA sequence length is chosen by estimating the power used by the UEs in a cell and comparing this with the maximum power allowed. As stated above in equ. 2:

$$P_{PRACH} = \min\{P_{0\_PRACH} - PL + (N-1)\cdot\Delta_{RACH} + \Delta_{Preamble}, P_{max}\}$$

where $$\Delta_{Preamble} = \begin{cases} 0 dB & \text{for } normallong \text{ preambles} \\ -3 dB & \text{for long preambles} \end{cases}$$

Considering the maximum allowed power, $P_{max}$, and the 3 dB higher signal power upon reception of a long preamble it is realized that the detection of one single RA attempt would gain from a long preamble format only if the format-independent desired RACH power, $P_D$ defined below, is larger than the maximum UE power, $P_{max}$.

$$P_D = P_{0\_PRACH} - PL + (N-1)\cdot\Delta_{RACH} \quad (3)$$

The RA preamble format optimization aims at maximizing the number of UEs successfully performing a random access, regardless of the number of retransmissions. Only the power $P_D$ for successful RA attempts is considered when choosing the RA sequence length. The decision whether the RA performance in a cell would gain from a long preamble or not should be based on the distribution of the desired RACH power for all different UEs in the cell.

Methods for estimating the desired RACH power will in the following be described as well as two different alternative methods to choose the RA sequence length based on this estimate. The two alternative methods assume that the value of $P_{max}$ is known for some or all of the UEs in the cell. This could for example be reported by the UE performing the random access or be estimated based on information from UE manufacturers. Out of the two alternatives described further below, method a) is the preferred one, since this only requires knowledge of the smallest possible value of $P_{max}$.

Estimating the Desired RACH Power

To decide which RA sequence length to use, the desired RACH power $P_D$, $$P_D = P_{0\_PRACH} - PL + (N-1)\cdot\Delta_{RACH} \quad (4)$$

is estimated for each successful random access attempt k to consider. The values of $P_{0\_RACH}$, $\Delta_{RACH}$ are known by the eNB. So is the current preamble format, and, hence, the value of $\Delta_{preamble}$. $P_D$ can for example be estimated using one of the following methods:

a) Assuming the UE transmission power $P_{PRACH,k}$ is reported from the UE to the eNB for each successful random access k:

$$P_{D,k} = P_{0\_PRACH} - PL_k + (N_k-1)\cdot\Delta_{RACH} \approx P_{PRACH,k} - \Delta_{Preamble} \quad (5)$$

b) Assuming the downlink path loss estimate $PL_k$ and the number of RA attempts $N_k$ are reported from the UE to the eNB for each successful random access k:

$$P_{D,k} = P_{0\_PRACH} - PL_k + (N_k-1)\cdot\Delta_{RACH} \quad (6)$$

c) Assuming the number of random access attempts $N_k$ is reported from the UE to the eNB for each successful random access k and that the path loss is estimated by the eNB to $PL_{e,k}$, for example by using uplink path loss measurements:

$$P_{D,k} \approx P_{0\_PRACH} - PL_{e,k} + (N_k-1)\cdot\Delta_{RACH} \quad (7)$$

d) Assuming that the received preamble power $P_{PRACH\_rec,k}$ for each successful random access attempt k is measured at the eNB and that the path loss is estimated by the eNB to $PL_{e,k}$, for example by using uplink path loss measurements:

$$P_{D,k} \approx P_{PRACH\_rec,k} - PL_{e,k} - \Delta_{Preamble} \quad (8)$$

e) Assuming that the received preamble power $P_{PRACH\_rec,k}$ for each successful random access attempt k is measured at the eNB and that the estimated downlink path loss $PL_k$ is reported from the UE to the eNB for each successful random access:

$$P_{D,k} \approx P_{PRACH\_rec,k} - PL_k - \Delta_{Preamble} \quad (9)$$

Note that with method a), d) or e) it will not be possible to tell whether $P_{D,k}$ is larger than or equal to $P_{max}$ as the estimates are based on the actual transmitted or received power, i.e. power levels limited by $P_{max}$. An estimate of $P_{D,k}$ equal to $P_{max}$ however indicates that the UE could gain from using a long preamble format. Since method d) does not require any measurement reports from the UE, this is the preferred method.

Choosing RA Sequence Length—Alternative A

The desired RACH power reference, $P_{DR}$ is introduced as a reference value of the different desired RACH power $P_D$ for each successful random access attempt to consider. For example, $P_{DR}$ may be estimated such that the probability p that $P_{DR} \geq P_D$ is $\alpha$ for a random access attempt in the given cell, $$p(P_{DR} \geq P_D) = \alpha, 0 \leq \alpha \leq 1 \quad (10)$$

where $\alpha$ is preferably set to one or a value close to one.

$P_{DR}$ may for example be found as the $100\cdot\alpha$-percentile of all values $P_{D,k}$ for k=1, 2, . . . , M, where M is the given number of successful random access attempts to consider.

Further, the reference power limit, $P_R$ is introduced in order to take different values of $P_{max}$ for different UE types into account. For example, $P_R$ can be set to a value such that the probability p that $P_R > P_{max}$ is smaller than or equal to $\lambda$ for a UE in the given cell, $$P\{P_R > P_{max}\} \leq \lambda \quad (11)$$

where $\lambda$ is preferably set to zero, or a value close to zero.

The reference power limit, $P_R$ may for example be found using one of the following methods:

a) $P_R$ is set to the $100\cdot\lambda$-percentile of all possible values of $P_{max}$ in the cell. This method requires that all possible values of $P_{max}$ in the cell are known. In the special case of this method, described below, when $\lambda=0$ it is enough to know the lowest possible value of $P_{max}$.

b) $P_R$ is set to the $100 \cdot \lambda$-percentile of all values of $P_{max}$ corresponding to the last M successful random access attempts. This method requires that all values of $P_{max}$ corresponding to the last M successful random access attempts are known.

The RA sequence length is then chosen according to the following procedure:

Use a long preamble format as default at startup;
When using a long preamble format, change to a normal long preamble format if $$P_{DR} < P_R - \gamma, 0 < \gamma < P_R \quad (12)$$

where $\gamma$ is a reference power margin in order to prevent the preamble format from oscillating when $P_{DR}$ varies around a value close to $P_R$ When using a normal long preamble, change to a long preamble format if $$P_{DR} \geq P_R$$

Choosing RA Sequence Length—Alternative A Method a): Special Case $\lambda=0$

The special case of alternative A method a) with $\lambda=0$ simplifies the task of choosing the RA sequence length but still provides a safe way to make sure that the RA sequence is not chosen to short. With $\lambda=0$ we set the reference power limit to the lowest possible value of $P_{max}$;

$$P_R = P_{max\_min} = \min(P_m) \quad (13)$$

where $P_m$ is the set of all possible values of $P_{max}$.

The RA sequence length is chosen according to the following procedure:

Use a long preamble format as default at startup
When using a long preamble format, change to a normal long preamble format if $$P_{DR} < P_{max\_min} - \gamma, 0 < \gamma < P_{max\_min} \quad (14)$$

where $\gamma$ is a reference power margin in order to prevent the preamble format from oscillating when $P_{DR}$ varies around a value close to $P_{max\_min}$.

When using a normal long preamble, change to a long preamble format if $P_{DR} \geq P_{max\_min}$ Choosing RA Sequence Length—Alternative B The UE power usage weight $w_k$ is introduced based on the desired RACH power estimate $P_D$ and the maximum power $P_{max}$ for each successful random access attempt k to consider.

$$w_k = \frac{P_{D,k}}{P_{max,k}} \quad (15)$$

A reference power usage weight $w_R$ is introduced as a reference value of the different UE power usage weights $w_k$ for UEs in the cell. For example, $w_R$ may be estimated such that the probability p that $w_R \geq w_k$ is $\beta$ for a random access attempt in the given cell, $$P(w_R \geq w_k) = \beta, 0 \leq \beta \leq 1 \quad (16)$$

$\beta$ is a value between 0 and 1 and should preferably be set to 1 or a value close to 1. For example, $w_R$ can be found as the $100 \cdot \beta$-percentile of the estimated values $w_k$, $k=1, 2, \ldots, M$, where M is the given number of successful random access attempts to consider.

The RA sequence length is then chosen according to the following procedure:

Use a long preamble format as default at startup
When using a long preamble format, change to a normal long preamble format if $$w_R < 1 - \gamma, 0 < \gamma < 1 \quad (17)$$

where $\gamma$ is a reference power weight margin in order to prevent the preamble format from oscillating when $w_R$ varies around a value close to 1

When using a normal long preamble, change to a long preamble format if $w_R \geq 1$ Choosing RA Sequence Length—Second Embodiment In a second embodiment of this invention, the RA sequence length is chosen by studying the distribution of the received energy for each successful RA attempt during a given test period. The objective during the test period is to enforce the mobiles to use a higher power to gather statistics about whether the RA sequence length is coverage limiting or not.

Figure 10:
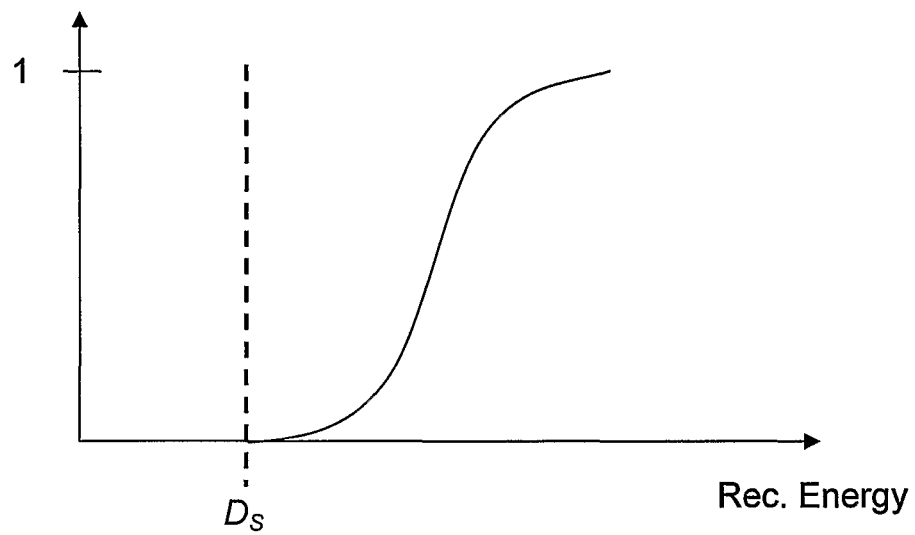
FIG. 10 shows the cumulative distribution function of received energy for successful random access attempts before a test period.

Use a long preamble format (preferably format 3) during the test period. Assume that the preamble detection threshold D has been tuned and is set to the stable value $D_S$, i.e. $D=D_S$. Assume also that the value of the target received power $P_{0\_PRACH}$ is set to the stable value $P_{0\_PRACH\_S}$, $P_{0\_PRACH} = P_{0\_PRACH\_S}$. The cumulative distribution function (CDF) of the received energy for successful RA attempts is illustrated in FIG. 10.

Increase the values of $P_{0\_PRACH}$ and D with 3 dB to $P_{0\_PRACH}'$ and D' during a test period.

$$P_{0\_PRACH}' = P_{0\_PRACH\_S} + 3 \text{ dB} \quad (18)$$

$$D' = D_S + 3 \text{ dB} \quad (19)$$

Figure 11:
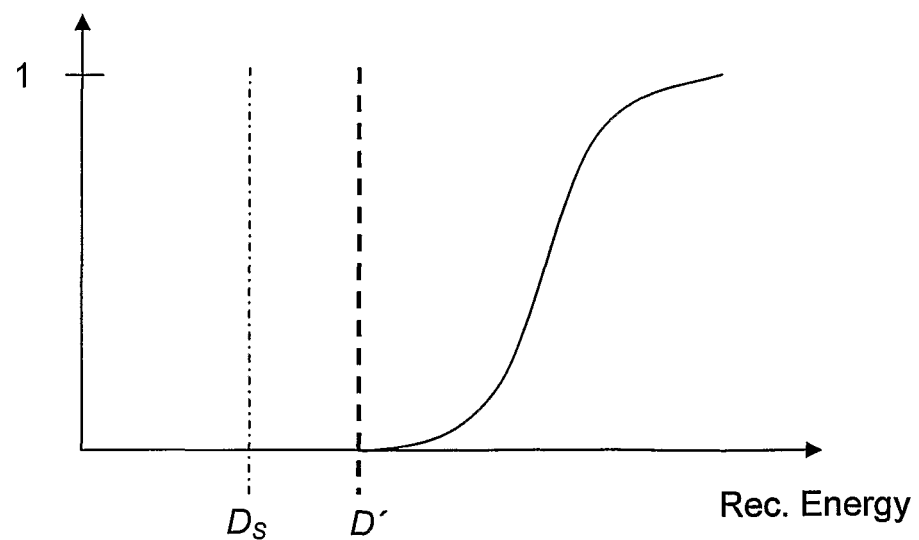
FIG. 11 shows the cumulative distribution function of received energy for successful random access attempts during the test period.

Studying the CDF of the received energy for successful RA attempts using the higher values on D and $P_{0\_PRACH}$ gives the same curve moved 3 dB to the right, see FIG. 11. This means that the distribution of successful RA attempts does not change during the test period. As an example in this embodiment, the values of $P_{0\_PRACH}$ and D are increased with 3 dB. Other pre-determined values than 3 dB are of course possible to use. Preferably, the increase value is chosen depending on the number of preamble repetitions.

Figure 12:
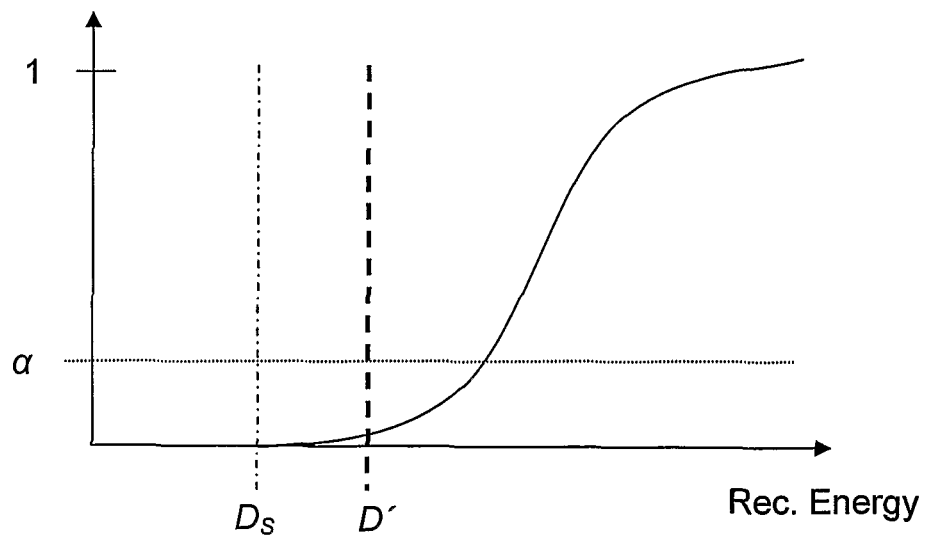
FIG. 12 shows the cumulative distribution function of received energy for random access attempts detected with received energy larger than $D_S$ during the test period.
Figure 13:
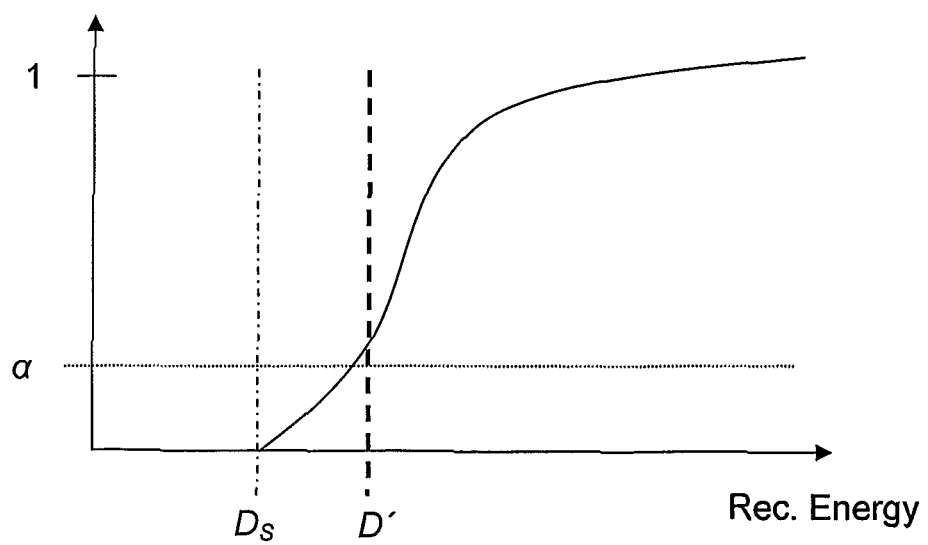
FIG. 13 shows another cumulative distribution function of received energy for random access attempts detected with received energy larger than $D_S$ during the test period.

However, by studying the CDF of the received energy for all RA attempts with received energy higher than the original threshold Ds, see FIG. 12 and FIG. 13, additional information on UEs in the cell can be found. Since $P_{0\_PRACH}$ has been raised it is possible to detect whether there are UEs within the coverage area of the cell that have the capability to raise their transmission power higher than they needed to with the original configuration. These UEs are not power limited and would still be able to make successful RA attempts even if a normal long preamble format would be used.

The RA sequence length is chosen according to the following procedure:

If the ratio of the RA attempts for which the received RA power smaller than D' is lower than a value α, see FIG. 12, a normal long preamble should be used.
Else, a long preamble should be used, see FIG. 13.

Once the preamble format length has been evaluated and, if needed, changed, $P_{0\_PRACH}$ and D are reset to their original values.

Test periods when the values of $P_{0\_PRACH}$ and D are increased could for example be run on a regular basis, be triggered upon detected problems, or be triggered manually.

Choosing Preamble Cyclic Prefix

As stated above, the cyclic prefix time should be equal to or larger than the maximum round-trip time and the maximum multipath delay, $$T_{CP} \geq T_{RT} + T_{MD} \tag{20}$$

To choose the preamble cyclic prefix a target cyclic prefix time $T_{CP\_target}$ is estimated. The target cyclic prefix time may be based on estimates of $T_{RT}$ and $T_{MD}$ for the last M detected RA attempts. For more accurate estimates only the last M detected dedicated preamble RA attempts may be used. Different methods for estimating the round-trip time and the maximum multipath delay are described in more detail below.

Let $S_{RT}$ be the set of estimates of $T_{RT}$ for the M detected RA attempts to consider. Further, let $S_{MD}$ be the set of estimates of $T_{MD}$ for the M detected RA attempts to consider. Finally, let $S_D$ be the set of estimates of $T_D = T_{MD} + T_{RT}$ for the M detected RA attempts to consider. The target cyclic prefix time can be found using one of the following methods, where method b is preferred:

a)

$$T_{CP\_target} = \max\{S_{RT}\} + \max\{S_{MD}\} \tag{21}$$

b)

$$T_{CP\_target} = \max\{S_D\} \tag{22}$$

The preamble format with the desired RA sequence length and the smallest cyclic prefix time larger than $T_{CP\_target}$ is then used.

Estimating the Round-Trip Delay

The maximum round-trip delay should be used as input data when choosing the cyclic shift of the root sequence, so the value of the maximum round-trip delay should already be known in the eNB. However, with changing radio conditions the cell size, also the maximum round-trip time, may change.

Assuming that the cyclic shift and the cyclic prefix are dimensioned large enough for RA attempts to be detected; the round-trip delay can be estimated based on the placement of the detected correlation peak within the correlation zone. The skilled person realizes how this estimation is performed and this is not further discussed herein.

Estimating the Maximum Multipath Delay Using a Multipath Component Detection Threshold Define a multipath component detection threshold, $D_M$ in order to separate the multipath correlation components from noise. Correlation peaks that are following a detected main correlation peak and that are above the threshold $D_M$ are considered to be multipath correlation peaks. To easier separate the multipath components from the noise the target received power $P_{0\_PRACH}$ could be temporarily raised during the estimation of the maximum multipath delay. The detection threshold D may be raised equally in order not to disturb RA attempts during the temporary time. Study the placement of the last multipath component in the correlation zone compared to the placement of the detected main correlation peak to find the maximum multipath delay.

The threshold $D_M$ could for example be based on a noise floor estimate F.

One way to estimate the noise floor F is to study the noise components in the correlation zones for dedicated preambles in time slots and correlation zones for preambles that are not being used. The correlation peaks found in these unused zones are called noise components and are denoted $N_1, N_2, \ldots, N_L$ where L is the number of correlation peaks found for the last M unused dedicated preamble correlation zones. The noise floor F can then be estimated as:

a) the $\delta$-percentile of the noise components $N_1, N_2, \ldots, N_L$, $0 < \delta \leq 100$, where $\delta$ is preferably set to a value close to 100, for example 90.

b) the mean value of $N_1, N_2, \ldots, N_L$

The multipath component detection threshold can then be set to a value above the noise floor:

$$D_m = F + \epsilon, \text{ where } \epsilon > 0 \tag{23}$$

The threshold $D_M$ should be updated regularly, in order to capture any changes in the noise situation in the cell. Note that the multipath component detection threshold optimization is a process separated from the RA preamble format optimization, but may be used in order to find a good maximum multipath delay estimate used by the same.

Estimating the Maximum Multipath Delay Using the Delay Spread

The delay spread, $T_m$, is a measure of the maximum time difference between the arrival of the first and the last multipath signal. Hence, the maximum multipath delay can be approximated using a delay spread estimate, $T_m$.

$$T_{MD} \approx T_m \tag{24}$$

Figure 14:
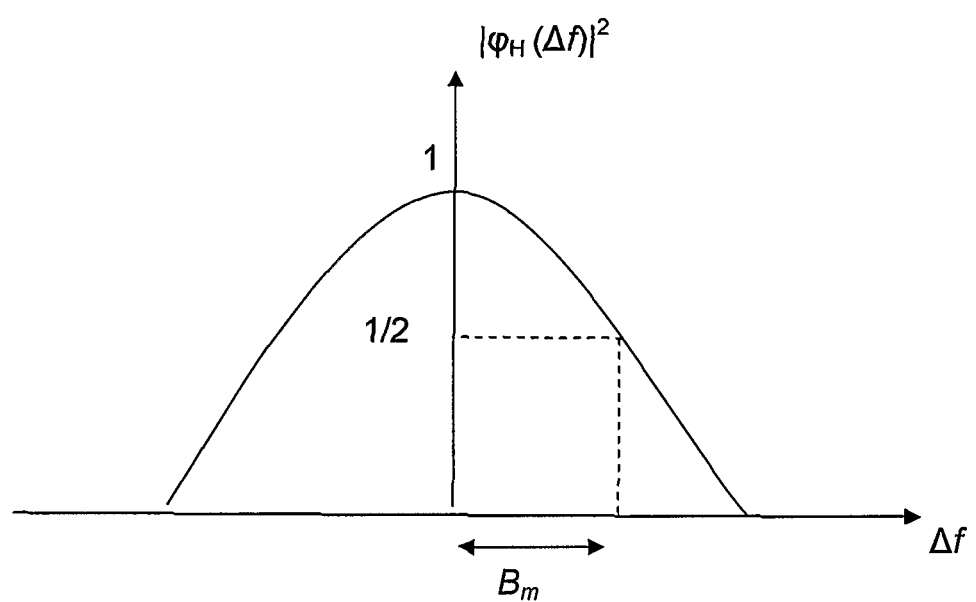
FIG. 14 shows the relation between the frequency correlation function and the coherence bandwidth.

A method for estimating the delay spread that should be well known for anyone skilled in the art is to study the frequency correlation function, $\phi_H(\Delta f)$ of the received signal components to find the coherence bandwidth, $B_m$, see FIG. 14.

The delay spread $T_m$ is then estimated as $$T_m \approx \frac{1}{2\pi B_m} \tag{25}$$

This gives an estimate of the maximum multipath delay $$T_{MD} \approx \frac{1}{2\pi B_m} \tag{26}$$

In the following, the different embodiments of the invention described hitherto will be put together and illustrated by flowcharts in FIGS. 15 to 18.

The RA preamble format optimization process may e.g. be started upon:

The startup of a new cell

A manual request from operator

The detection of a problem that could be connected to the preamble format, for example a high rate of preamble retransmission attempts that is not solved by the power control optimization.

The RA preamble format optimization process may also be ran continuously or regularly with given time intervals.

The optimization algorithm should preferably be started using a preamble format with a long RA sequence and a long cyclic prefix. For LTE, a suitable preamble format to start with would be format 3.

Since a preamble format with too short RA sequence or too short cyclic prefix could cause the correlation peaks not to be found, the estimates needed in the optimization criteria described above may not be good enough. It is therefore important that the process chooses a preamble format with a longer RA sequence and/or a longer cyclic prefix upon detected problems with the RA preambles that might be connected to the preamble format.

The mechanisms selecting the RA cyclic prefix and the RA sequence length may either be run together to adjust all aspects of the format, or separately to adjust only one of the aspects at the time.

When adjusting the RA sequence length separately it is important that the cyclic prefix time will not be shortened due to the format change. For LTE, a separate adjustment of the RA sequence length will never cause a change of the preamble format from a long format, i.e. from format 2 or 3, to format 0. This is because the cyclic prefix time for format 0 is shorter than the cyclic prefix time for both format 2 and 3.

Figure 15:
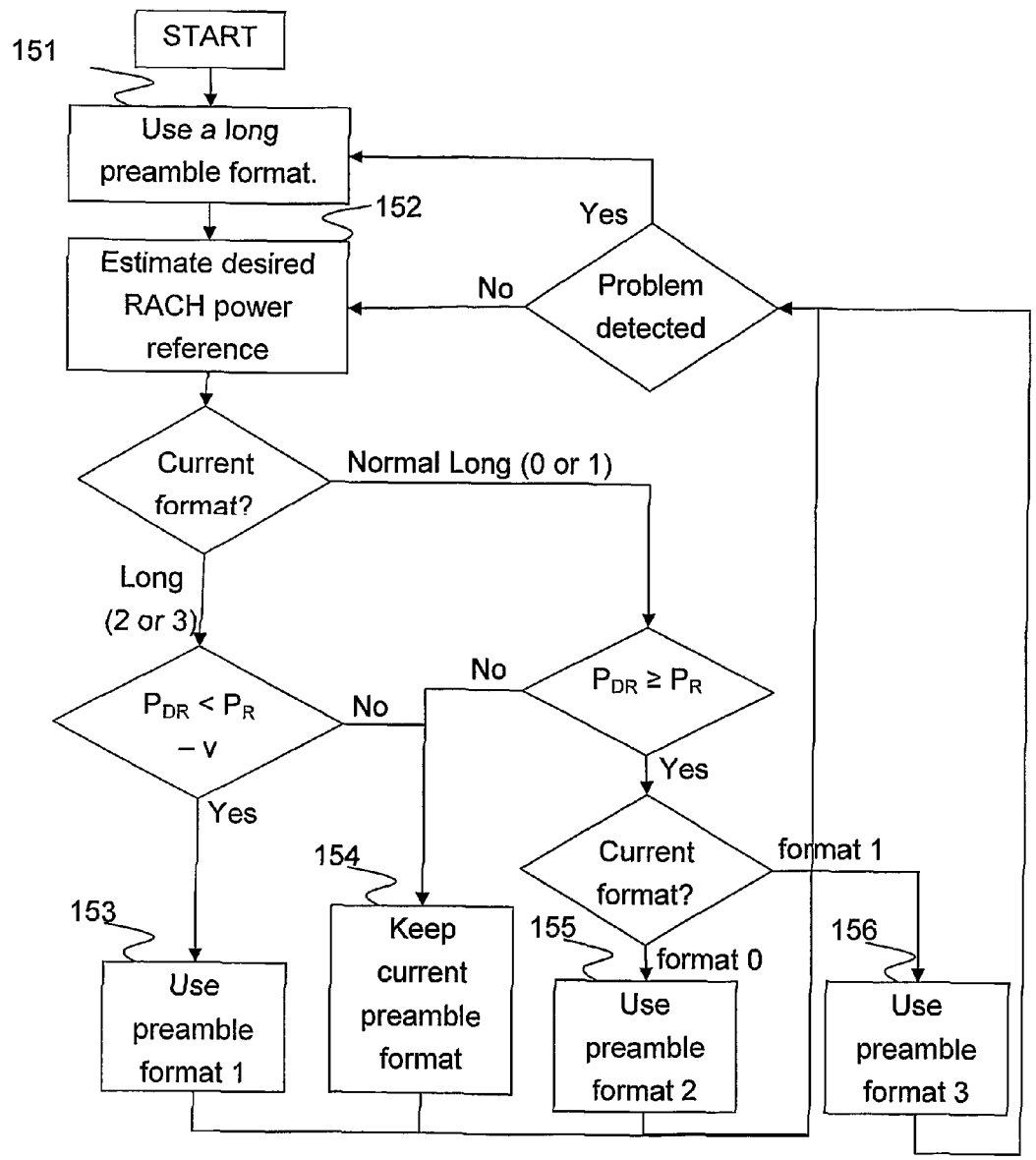
FIG. 15 is a flowchart illustrating the random access sequence length optimization for LTE according to a first embodiment of the present invention.

FIG. 15 illustrates an example of the first embodiment of the RA sequence length optimization procedure for LTE run separately:
  Using a long RA preamble format (step 151) as default at startup;
  Estimating desired RACH power reference (step 152);
  If current format is long (format 2 or 3) and if $P_{DR} < P_R - \gamma$, using preamble format 1 (step 153);
  Otherwise, if current format is long (format 2 or 3) and if $P_{DR} \geq P_R - \gamma$, keeping the current preamble format (step 154);
  If current format is normal long (format 0 or 1) and if $P_{DR} < P_R$, keeping the current preamble format (step 154);
  Otherwise, if current format is normal long (format 0 or 1), if $P_{DR} \geq P_R$, and if current format is preamble format 0, using preamble format 2 (step 155);
  Otherwise, if current format is normal long (format 0 or 1), if $P_{DR} \geq P_R$, and if current format is preamble format 1, using preamble format 3 (step 156);
  If a problem is detected, using a long preamble format starting over from step 151;
  Otherwise, estimating desired RACH power reference starting over from step 152;
  When a stop criteria is met, ending the optimization procedure (not shown).

Figure 16:
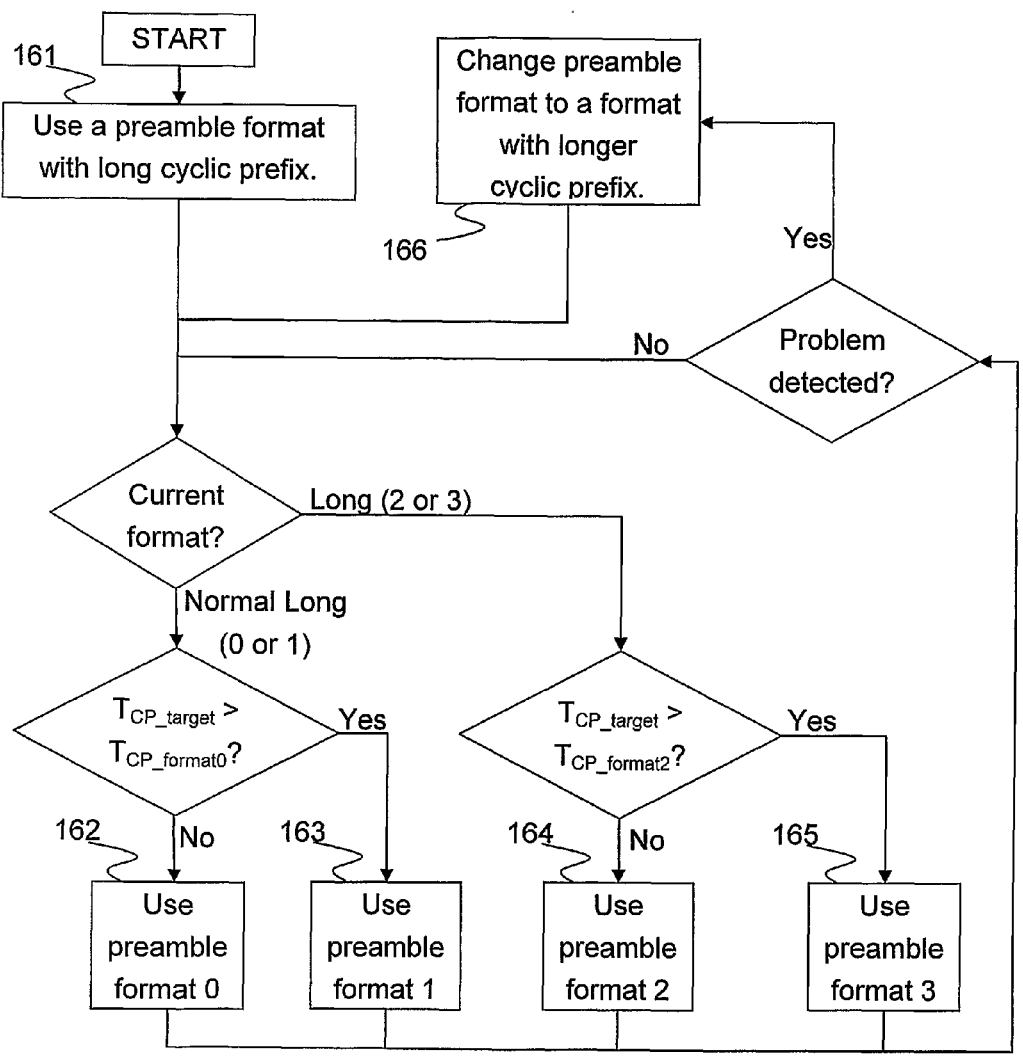
FIG. 16 is a flowchart illustrating the cyclic prefix time optimization for LTE.

Adjusting the cyclic prefix time separately for LTE is not quite as complicated, as the preamble formats 0 and 2 have the same RA sequence length, and the preamble formats 1 and 3 also have the same RA sequence length. In FIG. 16 an example of the cyclic prefix time optimization procedure for LTE run separately is illustrated:
  Using a RA preamble format with long cyclic prefix (step 161);
  If current format is normal long (format 0 or 1) and if $T_{CP\_target} \leq T_{CP\_format0}$, using preamble format 0 (step 162);
  Otherwise, if current format is normal long (format 0 or 1) and if $T_{CP\_target} > T_{CP\_format0}$, using preamble format 1 (step 163);
  If current format is long (format 2 or 3) and if $T_{CP\_target} > T_{CP\_format2}$, using preamble format 2 (step 164);
  Otherwise, if current format is long (format 2 or 3), and if $T_{CP\_target} > T_{CP\_format2}$, using preamble format 3 (step 165);
  If a problem is detected, changing preamble format to a format with longer cyclic prefix (step 166) and starting over from after step 161;
  Otherwise, starting over from after step 161;
  When a stop criteria is met, ending the optimization procedure (not shown).

For LTE, the cyclic prefix formats that may be used depends on the physical random access channel (PRACH) configuration, i.e. how often RA opportunities occur, and in particular how many subframes that are available for each random access attempt. For example, when PRACH configuration 14, as defined in 3GPP TS 36.211 Technical Specification is used, RA opportunities occur in each subframe, leading to a maximum time used for the RA attempt of 1 ms. As the only preamble format shorter than 1 ms is format 0, this is the only format that may be used when using PRACH configuration 14. The PRACH configuration is a trade-off between the RACH capacity and the physical uplink shared channel (PUSCH) capacity, and may be optimized separately. The trade-off between PRACH configuration and RA preamble format may be handled using prioritization.

Figure 17:
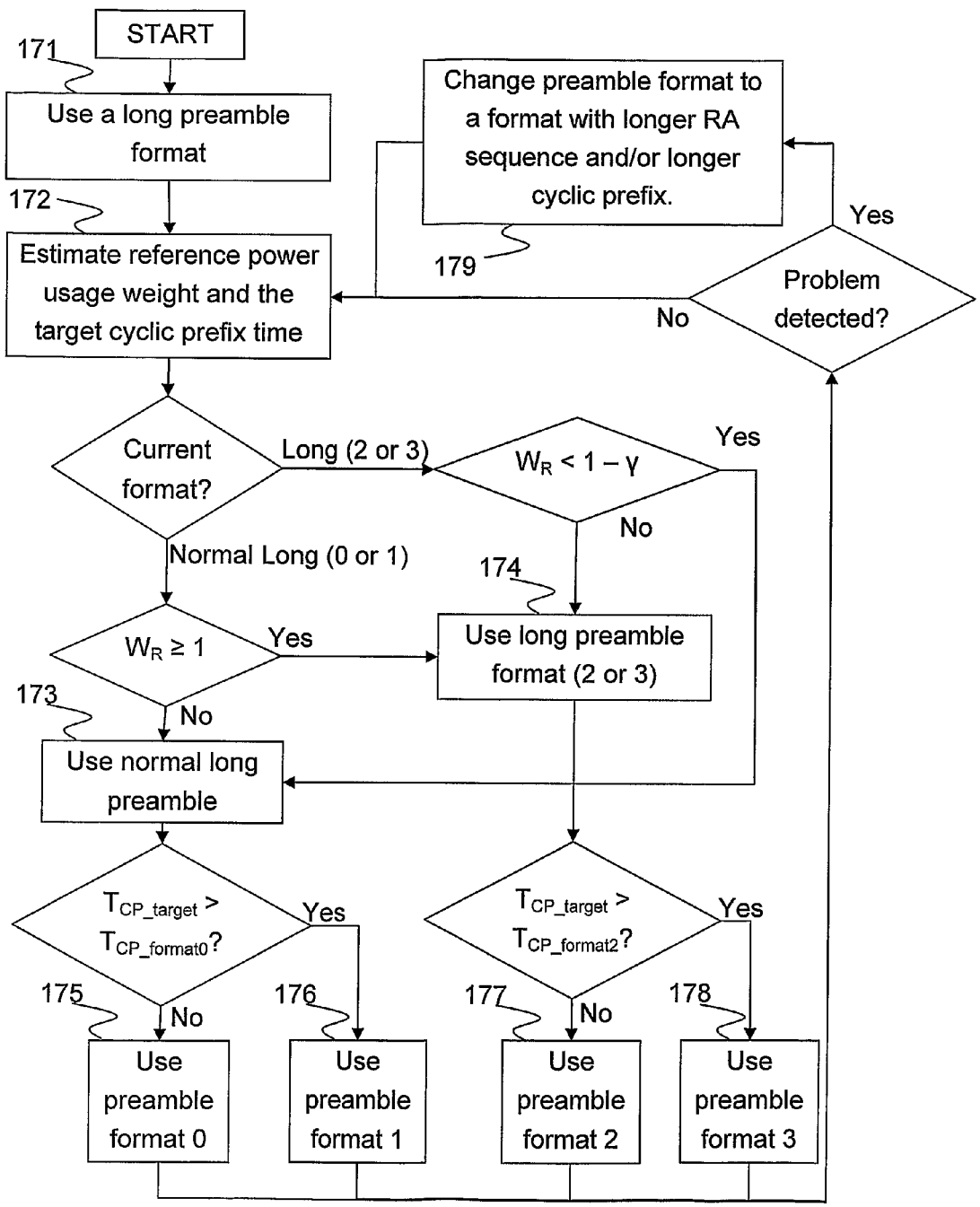
FIG. 17 is a flowchart illustrating the random access preamble format optimization for LTE according to the first embodiment of the present invention.

FIG. 17 illustrates an example of the first embodiment of the RA preamble format optimization procedure with RA sequence length and cyclic prefix time optimization run together:
  Using a long RA preamble format (step 171) as default at startup;
  Estimating reference power usage weight and the target cyclic prefix length (step 172);
  If current format is normal long (format 0 or 1) and if $W_R \leq 1$, using normal long preamble format (format 0 or 1) (step 173);
  Otherwise, if current format is normal long (format 0 or 1) and if $W_R \geq 1$, using a long preamble format (format 2 or 3) (step 174);
  Otherwise, if current format is long (format 2 or 3) and if $W_R < 1 - \gamma$, using normal preamble format (format 0 or 1) (step 173);
  Otherwise, if current format is long (format 2 or 3), and if $W_R \geq 1 - \gamma$, using a long preamble format (format 2 or 3) (step 174);
  After step 173 if $T_{CP\_target} \leq T_{CP\_format0}$, using preamble format 0 (step 175);
  Otherwise, if $T_{CP\_target} > T_{CP\_format0}$, using preamble format 1 (step 176);
  After step 174 if $T_{CP\_target} \leq T_{CP\_format2}$, using preamble format 2 (step 177);
  Otherwise, if $T_{CP\_target} > T_{CP\_format2}$, using preamble format 3 (step 178);
  If a problem is detected, changing preamble format to a format with longer RA sequence and/or longer cyclic prefix (step 179) and starting over from step 172;
  Otherwise, starting over from step 172;
  When a stop criteria is met, ending the optimization procedure (not shown).

Figure 18:
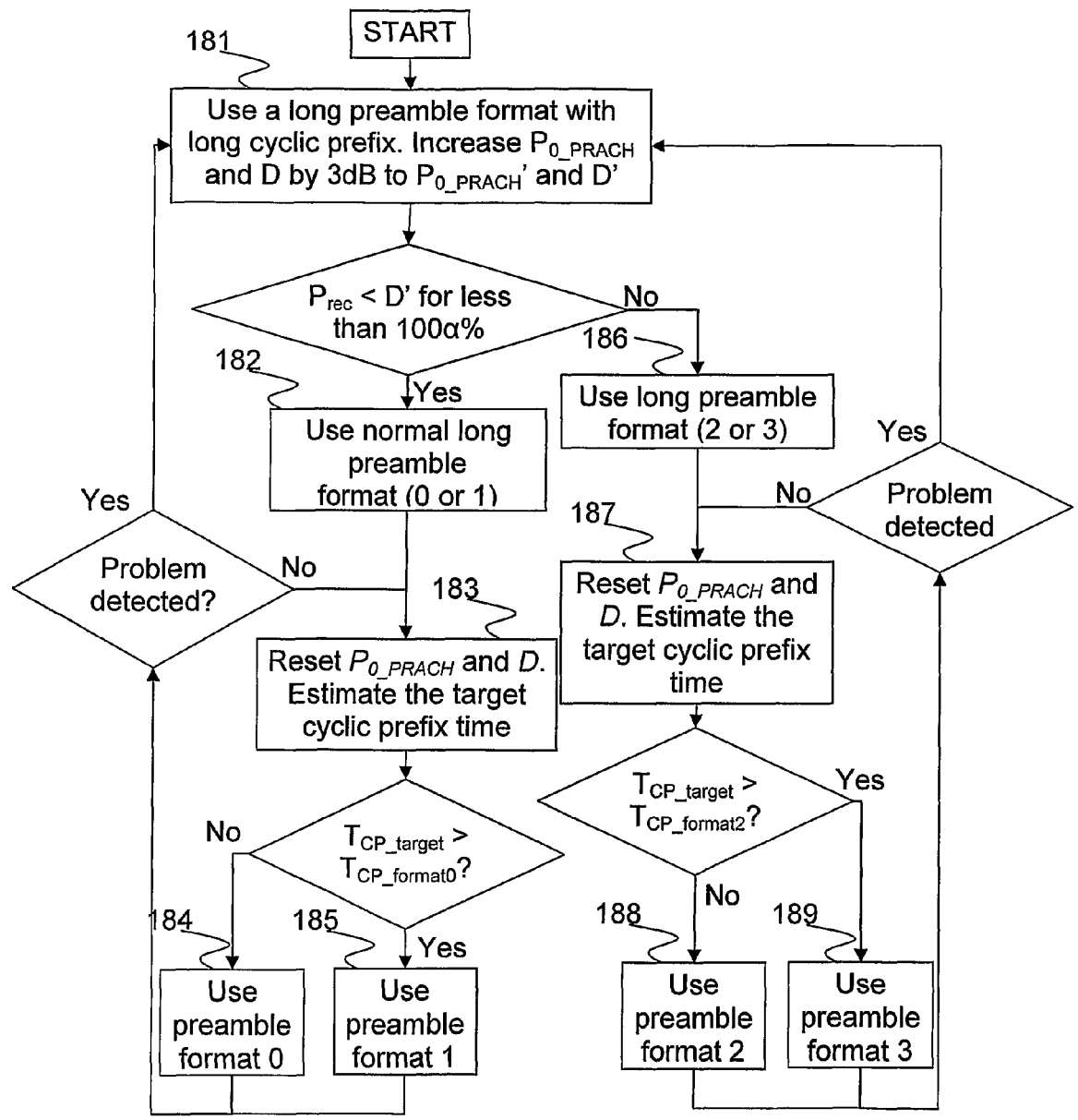
FIG. 18 is a flowchart illustrating the random access preamble format optimization for LTE according to a second embodiment of the present invention.

An example of the second embodiment of the RA preamble format optimization procedure is found in FIG. 18:
  Using a long preamble format with long cyclic prefix and increasing $P_{0\_PRACH}$ and D by e.g. 3 dB to $P_{0\_PRACH}'$ and D' (step 181);
  If $P_{rec} < D'$ for less than $100\alpha$ %, using normal long preamble format (format 0 or 1) (step 182);
    Resetting $P_{0\_PRACH}$ and D and estimating the target cyclic prefix time (step 183);
    If $T_{CP\_target} \leq T_{CP\_format0}$, using preamble format 0 (step 184);
    Otherwise, if $T_{CP\_target} > T_{CP\_format0}$, using preamble format 1 (step 185);
  Otherwise, using long preamble format (format 2 or 3) (step 186);
    Resetting $P_{0\_PRACH}$ and D and estimating the target cyclic prefix time (step 187)

If $T_{CP\_target} \leq T_{CP\_format2}$, using preamble format 2 (step 188);

Otherwise, if $T_{CP\_target} > T_{CP\_format2}$, using preamble format 3 (step 189);

If a problem is detected, starting over from step 181;

Otherwise, starting over from before step 183 and 187 respectively;

When a stop criteria is met, ending the optimization procedure (not shown).

Note, that it would also be possible to select a preamble format with a longer random access sequence length than desired in order to have the desired cyclic prefix length, or to select a preamble format with a longer cyclic prefix length than desired in order to have the desired random access sequence length. For LTE this could for example mean to select the long preamble format 2 in order to get a longer cyclic prefix length, even if the normal long preamble format 0 fulfills the demand on the random access sequence length.

Figure 19:
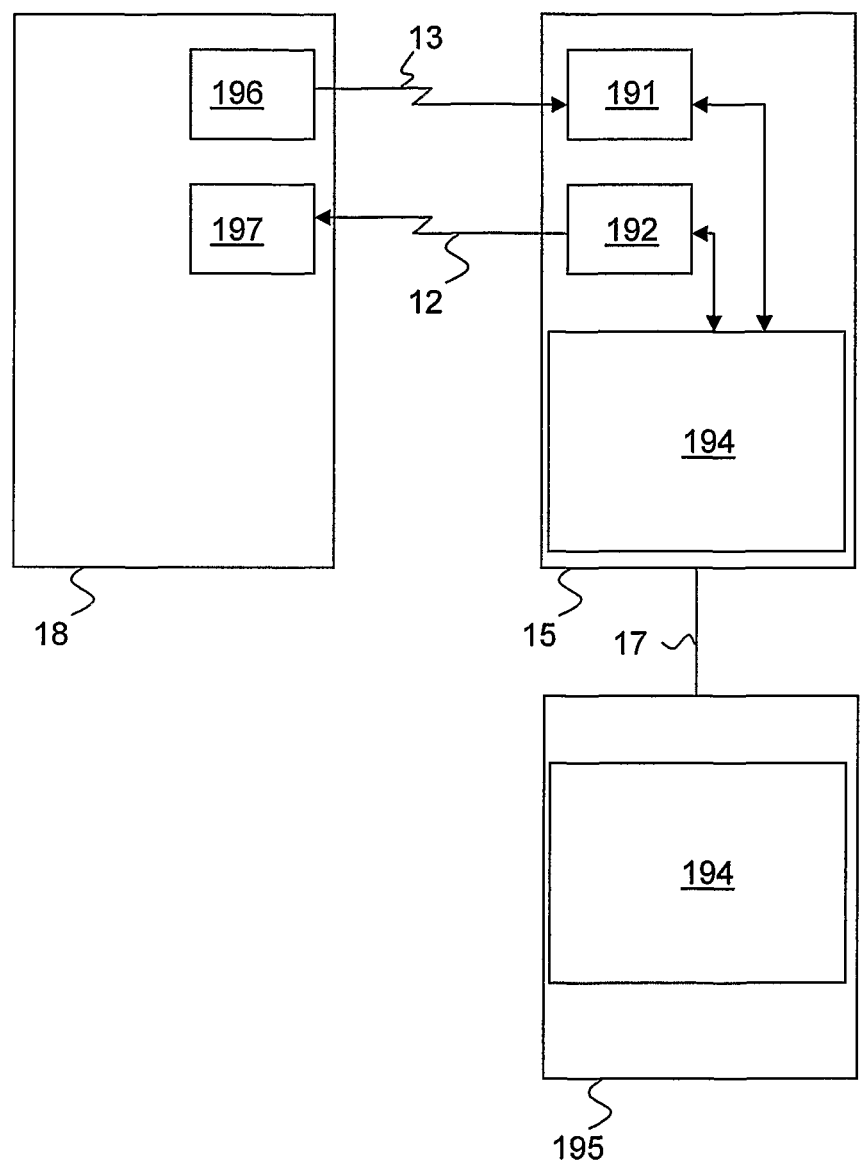
FIG. 19 is a simplified block diagram of a user equipment and an inventive radio base station and OSS unit.

FIG. 19 is a block diagram showing a user equipment 18, a radio base station (RBS) 15, such as eNode B, and an operating and support system (OSS) 195 for enabling automatic optimization of a random access preamble format usage in a communication network system comprising a communication network node, such as a RBS or a OSS, serving at least one cell to which user equipments are accessing, wherein a random access preamble format is set for each cell and comprises a random access sequence length, $T_{SEQ}$, and a random access preamble cyclic prefix length, $T_{CP}$.

The RBS 15 comprises a radio transmitter 192 and a receiver 191. The transmitter 192 is transmitting data to a receiver 197 of the user equipment 18 over a radio interface on the downlink channel 12. The receiver 191 is receiving data from the user equipment 18 on the uplink channel 13. The RBS 15 optionally further comprises a processing unit 194 configured to select said random access sequence length, $T_{SEQ}$;

select said random access preamble cyclic prefix length, $T_{CP}$; and, based on said selected random access sequence length, $T_{SEQ}$ and random access preamble cyclic prefix length, $T_{CP}$, select which random access preamble format to use in said cell.

The user equipment 18 comprises a radio transmitter 196 arranged to transmit data packets to the receiver 191 of the RBS 15 over the radio interface on the uplink channel 13 and a receiver 197 arranged to receive data packets transmitted from the transmitter 192 of the RBS 15 on the downlink channel 12.

The OSS 195 is communicating with the RBS 15 via the interface 17 and optionally comprises a processing unit 194 configured to select said random access sequence length, $T_{SEQ}$;

select said random access preamble cyclic prefix length, $T_{CP}$; and, based on said selected random access sequence length, $T_{SEQ}$ and random access preamble cyclic prefix length, $T_{CP}$, select which random access preamble format to use in said cell.

According to some embodiments of the invention, the processing unit is further configured to:

estimate a transmission power used by user equipments in said cell; and, compare said estimated transmission power with a maximum allowed power for said user equipments; and, select said random access sequence length, $T_{SEQ}$ based on said comparison.

According to some embodiments of the invention, the processing unit is further configured to:

use a long preamble format at startup;

estimate a desired random access channel power, $P_D$, for each successful random access attempt to consider;

when a long preamble format is used and if a reference value, $P_{DR}$, based on said estimated desired random access channel power, is less than a reference power limit, $P_R$, minus a reference power margin, $\gamma$, according to $P_{DR} < P_R - \gamma$, wherein $0 < \gamma < P_R$, then change to a normal long preamble format;

Otherwise, keep said long preamble format;

when a normal long preamble format is used and if said reference value, $P_{DR}$, is more or equals said reference power limit, $P_R$, according to $P_{DR} \geq P_R$, then change to a long preamble format;

Otherwise, keep said long preamble format.

According to some embodiments of the invention, the processing unit is further configured to:

use a long preamble format at startup;

estimate a desired random access channel power, $P_D$, for each successful random access attempt to consider;

when a long preamble format is used and if a reference value, $P_{DR}$, based on said estimated desired random access channel power, is less than a lowest possible value of said maximum allowed power, $P_{max\_min}$, minus a reference power margin, $\gamma$, according to $P_{DR} < P_{max\_min} - \gamma$, wherein $0 < \gamma < P_{max\_min}$, then change to a normal long preamble format;

otherwise, keep said long preamble format;

when a normal long preamble format is used and if said reference value, $P_{DR}$, is more or equals said lowest possible value of said maximum allowed power, $P_{max\_min}$, according to $P_{DR} \geq P_{max\_min}$, then change to a long preamble format;

Otherwise, keep said long preamble format.

According to some embodiments of the invention, the processing unit is further configured to:

use a long preamble format at startup;

estimate a desired random access channel power, $P_D$, for each successful random access attempt to consider;

when a long preamble format is used and if a reference power usage weight, $w_R$, based on said estimated desired random access channel power and said maximum allowed power, is less than one, minus a reference power margin, $\gamma$, according to $w_R < 1 - \gamma$, wherein $0 < \gamma < 1$, then change to a normal long preamble format;

otherwise, keep said long preamble format;

when a normal long preamble format is used and if said reference power usage weight, $w_R$, is more or equals one, according to $P_{DR} \geq 1$, then change to a long preamble format;

otherwise, keeping said long preamble format.

According to some embodiments of the invention, the processing unit is further configured to estimate said desired random access channel power, $P_D$, assuming that a user equipment transmission power, $P_{PRACH,k}$, is reported from said user equipment to said communication network node for each successful random access.

According to some embodiments of the invention, the processing unit is further configured to estimate said desired random access channel power, $P_D$, assuming that a downlink path loss estimate and a number of random access attempts are reported from said user equipment to said communication network node for each successful random access.

According to some embodiments of the invention, the processing unit is further configured to estimate said desired random access channel power, $P_D$, assuming that a number of random access attempts are reported from said user equipment to said communication network node for each successful random access and that a path loss is estimated by said communication network node to $PL_e$ by using uplink path loss measurements.

According to some embodiments of the invention, the processing unit is further configured to estimate said desired random access channel power, $P_D$, assuming that a received preamble power for each successful random access attempt is measured at said communication network node and that a path loss is estimated by said communication network node to $PL_e$ by using uplink path loss measurements.

According to some embodiments of the invention, the processing unit is further configured to estimate said desired random access channel power, $P_D$, assuming that a received preamble power for each successful random access attempt is measured at said communication network node and that an estimated downlink path loss is reported from said user equipment to said communication network node for each successful random access.

According to some embodiments of the invention, the processing unit is further configured to:
- increase a user equipment transmission power during a pre-determined test period;
- determine a distribution for received random access transmission power;
- select said random access sequence length, $T_{SEQ}$ based on said determined distribution.

According to some embodiments of the invention, the processing unit is further configured to:
- use a long preamble format during said test period;
- increase values of a target received random access transmission power, $P_{0\_PRACH}$, and a preamble detection threshold, D, with a pre-determined value during said test period;
- after said test period, study said determined distribution;
- if a ratio of random access attempts for which said received random access transmission power smaller than said increased preamble detection threshold, D', is less than a pre-determined value a, use a normal long preamble format;
- otherwise use a long preamble format.

According to some embodiments of the invention, said test period is at least one of the following: run on a regular basis, triggered upon detected problems or triggered manually.

According to some embodiments of the invention, the processing unit is further configured to:
- estimate a maximum round-trip delay and maximum multipath delay;
- select said random access preamble cyclic prefix length based on said estimates.

According to some embodiments of the invention, the processing unit is further configured to estimate said maximum round-trip delay based on a placement of a correlation peak within a correlation zone.

According to some embodiments of the invention, the processing unit is further configured to estimate said maximum multipath delay by using a multipath component detection threshold and a placement of a correlation peak.

According to some embodiments of the invention, the processing unit is further configured to estimate said maximum multipath delay by using a delay spread.

According to some embodiments of the invention, the processing unit is further configured to select said random access preamble format depending on a prioritization between the random access preamble format and a physical random access channel configuration.

According to some embodiments of the invention, the processing unit is further configured to start said random access preamble format optimization procedure upon at least one of the following: a startup of a new cell; a manual request from the operator; or, the detection of a problem connected to the preamble format or, to perform said random access preamble format optimization procedure continuously.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electro-magnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of enabling automatic optimization of a random access preamble format usage in a communication network system comprising a communication network node serving at least one cell to which user equipments are accessing, wherein a random access preamble format is set for said at least one cell and comprises a random access sequence length, $T_{SEQ}$, and a random access preamble cyclic prefix length, $T_{CP}$, the method comprising the steps of:

the network node selecting said random access sequence length, $T_{SEQ}$;
   the network node selecting said random access preamble cyclic prefix length, $T_{CP}$; and
   based on said selected random access sequence length, $T_{SEQ}$ and random access preamble cyclic prefix length, $T_{CP}$, the network node selecting which random access preamble format to use in said at least one cell, wherein said network node selects said random access preamble cyclic prefix length, $T_{CP}$, based on said selected random access sequence length, $T_{SEQ}$.

2. The method according to claim 1, wherein said selected random access preamble format is selected from a plurality of predefined random access preamble formats.

* * * * *